: US 10,402,595 B2
(45) Date of Patent: Sep. 3, 2019

(12) United States Patent
Armstrong et al.

(54) COMPUTING SYSTEM WITH NON-ORTHOGONAL DATA PROTECTION MECHANISM AND METHOD OF OPERATION THEREOF

(71) Applicant: CNEXLABS, Inc., San Jose, CA (US)

(72) Inventors: Alan Armstrong, Los Altos, CA (US); Yiren Ronnie Huang, San Jose, CA (US); Xiaojie Zhang, Saratoga, CA (US)

(73) Assignee: CNEX LABS, Inc., San Jose, CA (US)

( * ) Notice: Subject to any disclaimer, the term of this patent is extended or adjusted under 35 U.S.C. 154(b) by 168 days.

(21) Appl. No.: 15/156,974

(22) Filed: May 17, 2016

(65) Prior Publication Data

US 2017/0262646 A1 Sep. 14, 2017

Related U.S. Application Data

(60) Provisional application No. 62/307,251, filed on Mar. 11, 2016.

(51) Int. Cl.
*G06F 21/00* (2013.01)
*G06F 21/79* (2013.01)
*G06F 11/10* (2006.01)

(52) U.S. Cl.
CPC .......... *G06F 21/79* (2013.01); *G06F 11/1076* (2013.01); *G06F 2212/7208* (2013.01)

(58) Field of Classification Search
CPC ... G06F 12/06; G06F 12/1425; G06F 21/6218
See application file for complete search history.

(56) References Cited

U.S. PATENT DOCUMENTS 8,856,616 B1 * 10/2014 Peleato-Inarrea ............. G06F 11/1012 714/732

* cited by examiner

*Primary Examiner* — Brandon S Hoffman
*Assistant Examiner* — Thong P Truong
(74) *Attorney, Agent, or Firm* — Perspectives Law Group, Corp.

(57) ABSTRACT

A computing system includes: an interface circuit configured to provide access to a data block including an arrangement of multiple individual data; and a processing circuit, coupled to the interface circuit, configured to generate a non-orthogonal protection data corresponding to instances of the individual data along a non-orthogonal direction within the data block for correcting the one or more of the corresponding instances of the individual data.

20 Claims, 4 Drawing Sheets

COMPUTING SYSTEM WITH NON-ORTHOGONAL DATA PROTECTION MECHANISM AND METHOD OF OPERATION THEREOF

CROSS-REFERENCE TO RELATED APPLICATION(S)

This application claims the benefit of U.S. Provisional Patent Application Ser. No. 62/307,251 filed Mar. 11, 2016, and the subject matter thereof is incorporated herein by reference thereto.

TECHNICAL FIELD

An embodiment of the present invention relates generally to a computing system, and more particularly to a system for data protection.

BACKGROUND

Modern consumer and industrial electronics, especially devices such as graphical computing systems, televisions, projectors, cellular phones, portable digital assistants, and combination devices, are providing increasing levels of functionality to support modern life including three-dimensional display services. Research and development in the existing technologies can take a myriad of different directions. As data become more pervasive, existing and new systems need to interoperate and provide data reliability.

Thus, a need still remains for a computing system with data protection mechanism with soft information to provide improved data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus including: an interface circuit configured to provide access to a data block including an arrangement of multiple individual data; and a processing circuit, coupled to the interface circuit, configured to generate a non-orthogonal protection data corresponding to instances of the individual data along a non-orthogonal direction within the data block for correcting the one or more of the corresponding instances of the individual data.

An embodiment of the present invention provides a method including providing access to a data block including: an arrangement of multiple individual data; and generating with a processing circuit a non-orthogonal protection data corresponding to instances of the individual data along a non-orthogonal direction within the data block for correcting the one or more of the corresponding instances of the individual data.

An embodiment of the present invention provides a non-transitory computer readable medium including instructions for execution on a computing system, the instructions including: providing access to a data block including an arrangement of multiple individual data; and generating a non-orthogonal protection data corresponding to instances of the individual data along a non-orthogonal direction within the data block for correcting the one or more of the corresponding instances of the individual data.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
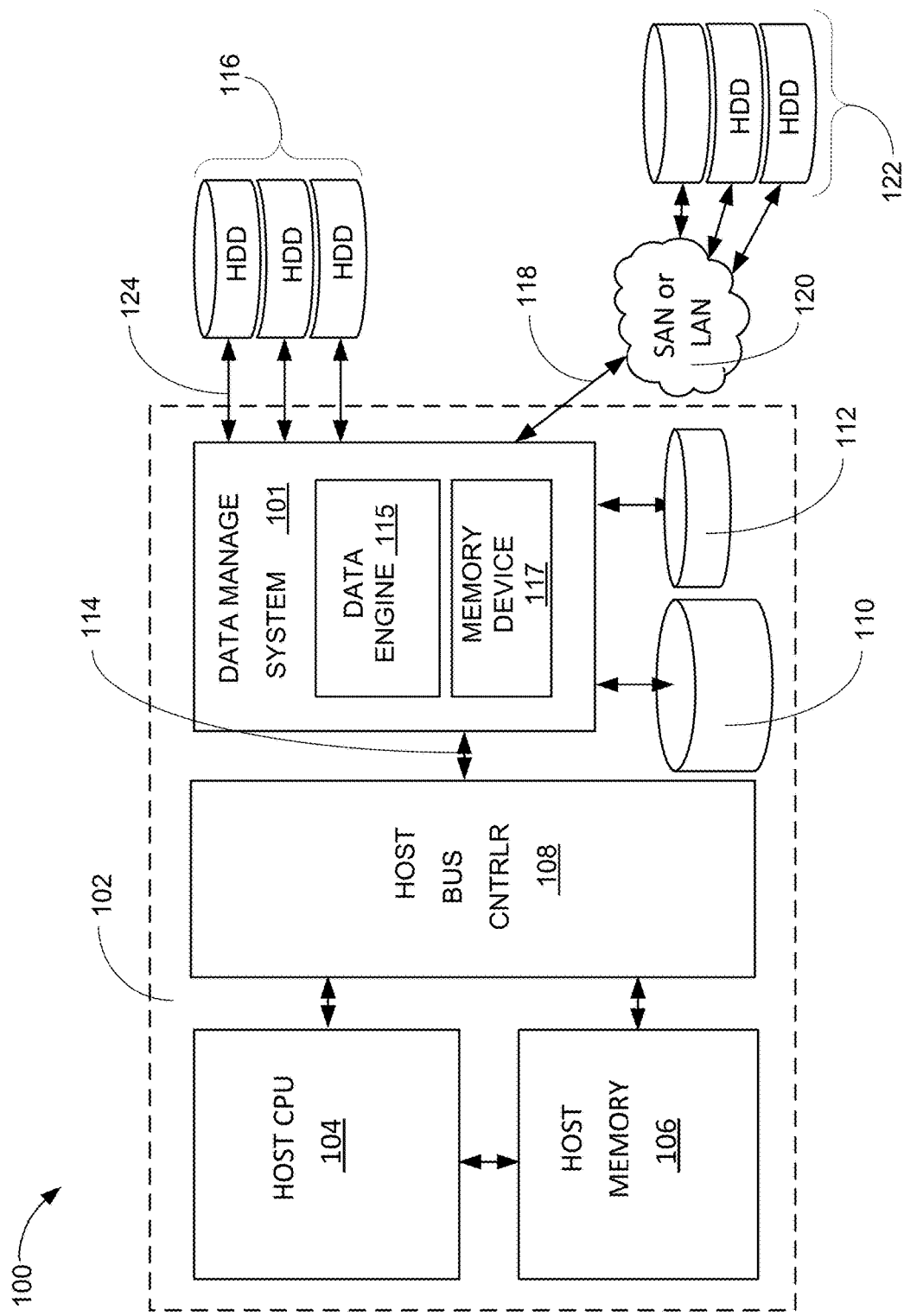
FIG. 1 is a computing system with non-orthogonal data protection mechanism in an embodiment.

The following embodiments can process and utilize non-orthogonal protection data for data block including grouping of individual data. The non-orthogonal protection data can be calculated or generated based on a subset of the individual data configured, sequenced, or arranged along a non-orthogonal direction within the data block. The data block can have 2 or more reference directions and the non-orthogonal direction can be not parallel to one or more of the reference directions. For example, the non-orthogonal direction can be separate or different from the reference directions and non-parallel to one or more, or all of the reference directions.

The non-orthogonal protection data can be further utilized with a length-wise protection data to decode or recover intended content data. The non-orthogonal protection data can be utilized or processed in a multi-stage recovery process. The non-orthogonal protection data can further leverage correlation in errors for computing system utilizing a NAND channel model, such as for Flash memory.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the embodiments can be operated in any orientation. The embodiments can be numbered first embodiment, second embodiment, etc. as a matter of descriptive convenience and are not intended to have any other significance or provide limitations for an embodiment.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section below, the modules are deemed to include hardware circuitry for the purposes and the scope of apparatus claims. The term "unit" referred to herein can include hardware only implementations, where performance requirements preclude the use of software.

Referring now to FIG. 1, therein is shown a computing system 100 with non-orthogonal data protection mechanism in an embodiment. The computing system 100 is depicted in FIG. 1 as a functional block diagram of the computing system 100 with a data management system 101. The functional block diagram depicts the data management system 101 installed in a host computer 102.

The host computer 102 can provide computational and interface resources for the computing system 100. The host computer 102 can also provide or interface with storage resources for or to the computing system 100.

The host computer 102 can be implemented in a number of ways. As an example, the host computer 102 can be as a server, workstation, a router, a desktop computer, a mobile computing device, a communication device, or a combination thereof. The host computer 102 can include at least a host central processing unit 104, a host memory 106 coupled to the host central processing unit 104, and a host bus controller 108.

The host bus controller 108 can provide interface functions to and from the host computer 102. As an example, the host bus controller 108 provides a host interface bus 114, which allows the host computer 102 to utilize the data management system 101.

It is understood that the function of the host bus controller 108 can be provided by host central processing unit 104 in some implementations. The host central processing unit 104 can be implemented with hardware circuitry in a number of different manners. For example, the host central processing unit 104 can be a processor, an application specific integrated circuit (ASIC) an embedded processor, a microprocessor, a hardware control logic, a hardware finite state machine (FSM), a digital signal processor (DSP), or a combination thereof.

The data management system 101 can provide storage capacity, communication processing, or a combination thereof for the computing system 100. The data management system 101 can also provide or include processing capabilities, similar to the host computer 102. As examples, the data management system 101 can be coupled to a solid state disk 110, such as a non-volatile memory based storage device including a peripheral interface system, or a non-volatile memory 112, such as an internal memory card for expanded or extended non-volatile system memory.

Also as examples, the data management system 101 can be coupled to other communication devices, endpoints, base stations, routers, network, gateways, or a combination thereof for wired or wireless exchange of data. The data management system 101 can include or utilize ports, antennas, microelectronics, connectors, transmitters, receivers, or a combination thereof.

The data management system 101 can also be coupled to hard disk drives (HDD) 116 that can be mounted in the host computer 102, external to the host computer 102, or a combination thereof. The solid state disk 110, the non-volatile memory 112, and the hard disk drives 116 can be considered as direct attached storage (DAS) devices, as an example.

The data management system 101 can also support a network attach port 118 for coupling to a network 120. The network 120 can provide a mechanism for connection between elements. The network 120 can span numerous distances, utilize numerous protocols, and can include both wired, optical, and wireless communications. Examples of the network 120 can be a local area network (LAN), a storage area network (SAN), wireless network, or a combination thereof. The network attach port 118 can provide access to network attached storage (NAS) devices 122, other communication devices, or a combination thereof.

While the network attached storage devices 122 are shown as hard disk drives, this is an example only. It is understood that the network attached storage devices 122 could include magnetic tape storage (not shown), and storage devices similar to the solid state disk 110, the non-volatile memory 112, or the hard disk drives 116 that are accessed through the network attach port 118. Also, the network attached storage devices 122 can include just a bunch of disks (JBOD) systems or redundant array of independent disks (RAID) systems as well as other network attached storage devices 122.

The data management system 101 can be attached to the host interface bus 114 for providing access to and interfacing to multiple of the direct attached storage (DAS) devices via a cable 124 for storage interface, such as Serial Advanced Technology Attachment (SATA), the Serial Attached SCSI (SAS), or the Peripheral Component Interconnect-Express (PCI-e) attached storage devices.

The data management system 101 can include a data engine 115 and memory devices 117. The data engine 115 can be implemented with hardware circuitry, software, or a combination thereof in a number of ways. For example, the data engine 115 can be implemented as a processor, an application specific integrated circuit (ASIC) an embedded processor, a microprocessor, a hardware control logic, a hardware finite state machine (FSM), a digital signal processor (DSP), or a combination thereof.

The data engine 115 can control the flow and management of data to and from the host computer 102, and from and to the direct attached storage (DAS) devices, the network attached storage devices 122, network, other communication devices or parties, or a combination thereof. The data engine 115 can also perform data reliability check and correction, which will be further discussed later. The data engine 115 can also control and manage the flow of data between the direct attached storage (DAS) devices and the network attached storage devices 122 and amongst themselves. The data engine 115 can be implemented in hardware circuitry, a processor running software, or a combination thereof.

For illustrative purposes, the data engine 115 is shown as part of the data management system 101, although the data engine 115 can be implemented and partitioned differently.

For example, the data engine 115 can be implemented as part of in the host computer 102, implemented partially in software and partially implemented in hardware, or a combination thereof. The data engine 115 can be external to the data management system 101. As examples, the data engine 115 can be part of the direct attached storage (DAS) devices described above, the network attached storage devices 122, or a combination thereof. The functionalities of the data engine 115 can be distributed as part of the host computer 102, the direct attached storage (DAS) devices, the network attached storage devices 122, or a combination thereof.

The memory devices 117 can function as a local cache to the data management system 101, the computing system 100, or a combination thereof. The memory devices 117 can be a volatile memory or a nonvolatile memory. Examples of the volatile memory can be static random access memory (SRAM) or dynamic random access memory (DRAM). As examples, the data engine 115 and the memory devices 117 enable the data management system 101 to meet the performance requirements of data provided by the host computer 102 and store that data in the solid state disk 110, the non-volatile memory 112, the hard disk drives 116, or the network attached storage devices 122.

For illustrative purposes, the data management system 101 is shown as part of the host computer 102, although the data management system 101 can be implemented and partitioned differently. For example, the data management system 101 can be implemented as a plug-in card in the host computer 102, as part of a chip or chipset in the host computer 102, as partially implemented in software and partially implemented in hardware in the host computer 102, or a combination thereof. The data management system 101 can be external to the host computer 102. As examples, the data management system 101 can be part of the direct attached storage (DAS) devices described above, the network attached storage devices 122, or a combination thereof. The data management system 101 can be distributed as part of the host computer 102, the direct attached storage (DAS) devices, the network attached storage devices 122, or a combination thereof.

Also for illustrated purposes, the data management system 101 is shown as part of a data management and storage system. However, the data management system 101 can operate as a communication device or party for wireless communication, wired communication, optical communication, ultrasonic communication, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path or the network. Ethernet, digital subscriber line (DSL), fiber to the home (FTTH), and plain old telephone service (POTS) are examples of wired communication that can be included in the network. Further, the network can traverse a number of network topologies and distances. For example, the network can include direct connection, personal area network (PAN), local area network (LAN), metropolitan area network (MAN), wide area network (WAN), or a combination thereof.

Figure 2:
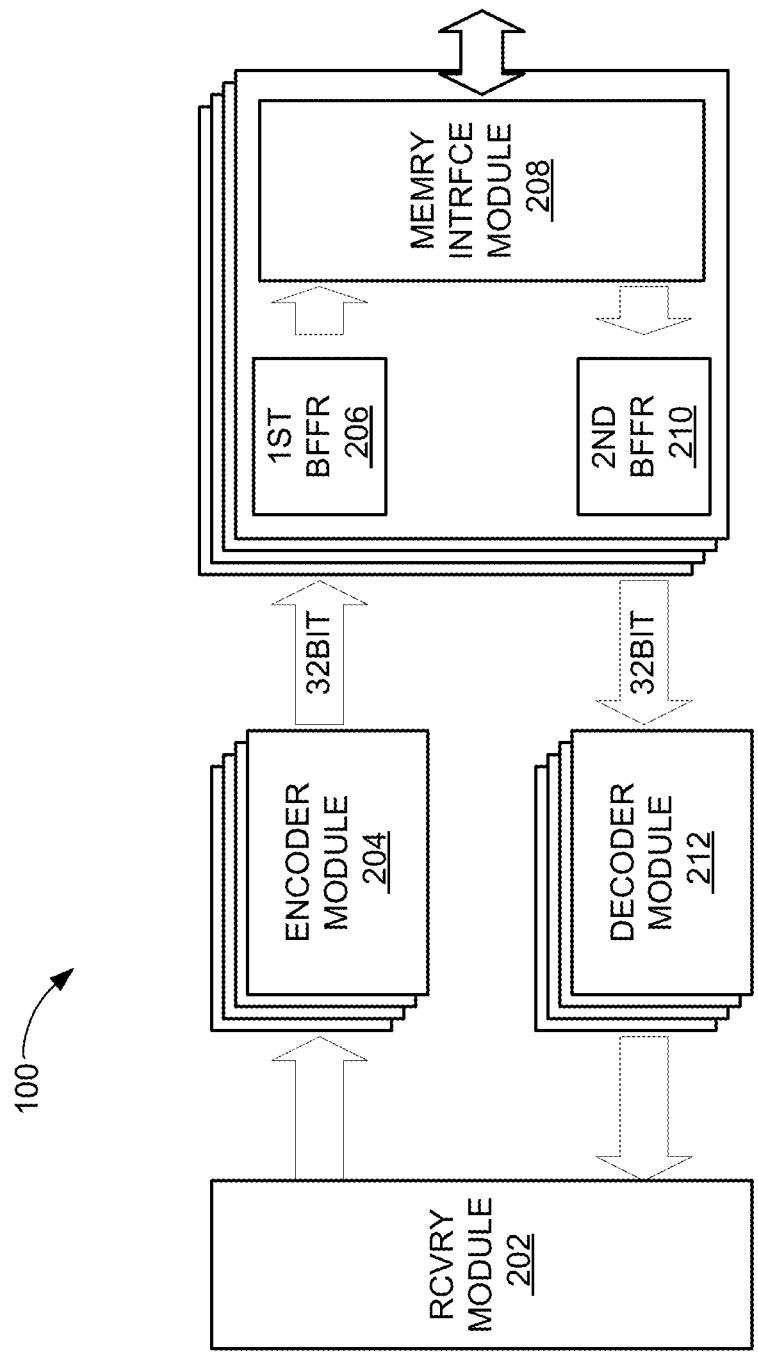
FIG. 2 is an exemplary architectural block diagram of the non-orthogonal data protection mechanism in an embodiment.

Referring now to FIG. 2, therein is shown an exemplary architectural block diagram of the non-orthogonal data protection mechanism in an embodiment. The architecture depicted in FIG. 2 can be implement in hardware circuitry, software, or a combination thereof. The block diagram can be within one of the elements described in the computing system 100 of FIG. 1 or distributed throughout the computing system 100. As an example, the data engine 115 of FIG. 1 can include an implementation of the block diagram shown in FIG. 2.

The block diagram can exemplify an architecture for a recovery engine to perform encoding and decoding of data stored to memory and read back from memory. The memory can be volatile, nonvolatile, or a combination thereof. The memory can be within one of the storage elements described in FIG. 1 or can be distributed among the storage elements described in FIG. 1.

The block diagram can include a recovery module 202, an encoder module 204, a first storage buffer 206, a memory interface module 208, a second storage buffer 210, a decoder module 212, or a combination thereof. The recovery module 202 can be configured to perform the high level recovery of data stored through the memory interface module 208. As an example, the recovery module 202 can perform redundant array of inexpensive disk (RAID) recovery. This recovery is described later.

The recovery module 202 can send data to the encoder module 204. The encoder module 204 can be configured to encode the received data and output the resulting encoded payload, which includes resulting data and redundancy. For example, the encoder module 204 can encode based on a 16×8 bit format. Also for example, the encoder module 204 can use compression mechanism, mapping mechanism, interleaving or rearranging mechanism, calculation mechanism for error detection or correction data, or a combination thereof. The redundancy can be for error detection, error correction, or a combination thereof. The redundancy will be described later.

The encoded payload can be communicated or sent for storage through the memory interface module 208. The first storage buffer 206 can serve as temporary storage to accommodate for the difference in data rates between the encoder module 204 and the memory interface module 208.

The memory interface module 208 can be configured to provide controls for the interface with the memory device, which can be one or more of the storage elements described in FIG. 1. The memory interface module 208 can provide the sequence of events, timing, and data to store the encoded payload. The memory interface module 208 can also provide the controls to retrieve information form the memory device.

The memory interface module 208 can provide the read data to the second storage buffer 210. The second storage buffer 210 can function as a temporary storage element and can compensate for the difference in data rate between the memory interface module 208 and the decoder module 212.

The decoder module 212 can be configured to decode or reverse the encoding process of the encoder module 204. The decoder module 212 can receive the read data and performs error detection, error correction, or a combination thereof. The decoder module 212 can operate based on the redundancy generated by the encoder module 204.

Figure 3:
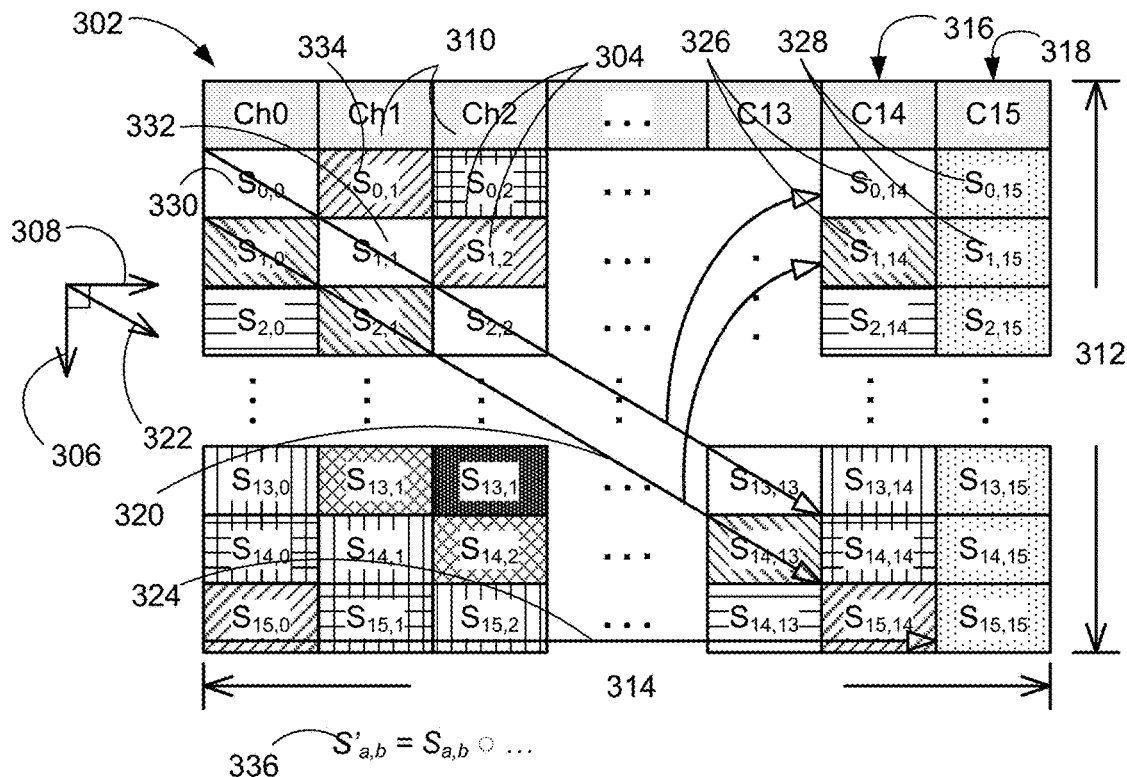
FIG. 3 is an exemplary illustration of a data block for the computing system of FIG. 1.

Referring now to FIG. 3, therein is shown an exemplary illustration of a data block 302 for the computing system 100 of FIG. 1. The data block 302 is a unit grouping of information. The data block 302 can be based on the unit grouping according to a division or a size corresponding to a format, a configuration, a standard, or a combination thereof. The computing system 100 of FIG. 1 can store, access, exchange or communicate between devices or within a device, or a combination thereof for the data block 302.

The data block 302 can be based on repetitive and expected boundaries or divisions in time, frequency, location, pattern, size or quantity, arrangement or sequence, or a combination thereof. For example, the data block 302 can include a frame, a page, a packet, a block, or a segment.

The data block 302 can further include a standardized or recognized grouping of various individual data 304. Each of the individual data 304 can include specific desired or targeted information subject to processing by the computing system 100. Each of the individual data 304 can include data to be protected. The data block 302 or one or more of the individual data 304 therein can be processed through the block diagram of FIG. 2.

For example, the data block 302 can represent physical storage that can contain information transferred from or to the host memory 106 of FIG. 1. The data block 302 can include storage elements from the host computer 102 of FIG. 1, the network attached storage devices 122 of FIG. 1, the direct attached storage (DAS) devices, or a combination thereof. As a more specific example, the data block 302 can represent physical storage including the memory devices 117 of FIG. 1, the solid state disk 110 of FIG. 1, the non-volatile memory 112 of FIG. 1, the hard disk drives 116 of FIG. 1, or a combination thereof.

Also as an example, the data block 302 can also represent a super block, which represents is a subdivision of a larger storage subsystem. When a storage device is too large to address directly, a super block can be used to account for a portion of the storage capacity. As an example, the super block can contain up to a maximum addressable space, such as 4 GB in 32 bit addressing, the number of super blocks can form the entire capacity. An example application where a super block can be utilized is in flash memory where the accounting of wear activity must be maintained for data protection and wear leveling.

The data block 302 can include data sectors. As an example, the data block 302 can be distributed across multiple devices, such as host computer 102, the direct attached storage (DAS) devices, the network attached storage devices 122, or a combination thereof. Also as an example, the data block 302 can be non-distributed and within one device in the computing system 100.

Also as an example, the data protection mechanism for the data block 302 can be implemented as a 2D RAID with one or more protection mechanism. In this example, the data block 302 can be a RAID block. The data block 302 can represent data organized in groups of the individual data 304 corresponding to sectors. The data block 302, one or more of the individual data 304 therein, or a combination thereof can be accessed using an interface circuit, such as the network attach port 118 of FIG. 1, the host interface bus 114 of FIG. 1, the cable 124 of FIG. 1, the data management system 101 of FIG. 1, the host bus controller 108 of FIG. 1, the memory interface module 208 of FIG. 1, or a combination thereof.

Each of the individual data 304 can include one or more code-words, symbols, or a combination thereof. Each of the individual data 304 can include a fixed number of bits or bytes. Each of the individual data 304 can include payload or content data, redundancy data, or a combination thereof. The redundancy data can be for error correction, error detection, or a combination thereof for the payload or content data.

Each of the individual data 304 can include content information that are independent or unrelated, related or associated, or a combination thereof relative to content of other instances of the individual data 304 within the data block 302. Each of the individual data 304 can include content data targeted for storage, access, exchange or communication, or a combination thereof. For example, the individual data 304 can include the encoded payload or data resulting from encoding process.

The intended or targeted content or payload information can be the input to the encoder module 204 of FIG. 2. The code-word, symbol, or a combination thereof can be the output of the encoder module 204. The code-word, symbol, or a combination thereof can include the redundancy data associated with the input content or payload according to the encoding process.

The code-word is a particular sequence of data or information for an error detection or error correction scheme. The redundancy data provides capabilities for the error detection, error correction, or a combination thereof for the payload or content data with which it is associated. The code-word can operate on or output soft information as well as the hard information. As a specific example, the redundancy data can operate on or output the soft information as well as the hard information.

Examples of redundancy data can include and can accommodate redundancy part of error correction codes (ECC), a cyclic redundancy check (CRC), or other types of error detection or correction schemes to form a code-word. As more specific examples, the code-word can be systematic code or nonsystematic code, a block code, or a convolution code. As further examples, the code-word can be a Bose, Chaudhuri, and Hocquenghem (BCH) code-word, a Reed-Solomon code-word, or a low density parity check (LDPC) code-word. The entirety of each of the individual data 304 can be used as the code-word for error detection and correction for, by example, an LDPC checker hardware structure (not shown).

For illustrative purposes, the code-word is descried as a BCH codeword, although it is understood the code-word can be other types using different error detection and correction codes. For example, other block codes can be utilized to form the code-word. As more specific examples, the code-word can be formed with Reed-Solomon code or LDPC code. The code-word can be utilized to provide the soft information, the hard information, or a combination thereof.

Also as a more specific example, the data block 302 can include 16 channels of non-volatile memory, with each channel including 16 instances of the individual data 304. Each of the individual data 304 can include the code-word with 512 B of content data and a byte of ECC data. The 16 channels of the data block 302 can include 14 data or content channels, and two channels including different parity information, such as corresponding to 'Dx' RAID and 'Diagonal' RAID.

The data block 302 can include the individual data 304 sequenced, arranged, located, linked or associated, or a combination thereof relative to each other for format, processing, or access instead of the content. For example, the data block 302 can include the individual data 304 formatted or configured according to a first direction 306 and a second direction 308.

The first direction 306 can be a sequence, a pattern, or an order for a subset or subgrouping of the individual data 304 associated with and included in the data block 302. The first direction 306 can be according to a track, a path, an increase or decrease, or a combination thereof relative to the arrangement, configuration, shape, or a combination thereof for the data block 302 overall.

The second direction 308 can be a sequence, a pattern, or an order for a further subset or subgrouping of the individual data 304 associated with and included in the data block 302, and different from the first direction 306. The second direction 308 can be according to a track, a path, an increase or decrease, or a combination thereof relative to the arrangement, configuration, shape, or a combination thereof for the data block 302 overall. The second direction 308 can be orthogonal to the first direction 306.

The first direction 306 and the second direction 308 can be predetermined by the computing system 100, a standard or an industry format, or a combination thereof. For illustrative purposes, the first direction is shown in FIG. 3 as being vertical or extending downward, and the second direction is shown as being horizontal or extending across from left to right.

The first direction 306 can correspond to the individual data 304 stored or accessible according to access channels 310. The second direction 308 can correspond to the individual data 304 corresponding to same position, order, location, or sequence within and across the access channels 310.

Each of the access channels 310 are the subgroupings or subsets of the individual data 304 associated with physical access or processing. For example, each of the access channels 310 can include independent incoming inputs or data streams in exchanging information between devices. Also for example, each of the access channels 310 can correspond to independent process or operations, such as write or read.

The access channels 310 can correspond to circuitry, device, capability, capacity, or a combination thereof associated with the computing system 100 as illustrated in FIG. 1 and FIG. 2. For example, each of the access channels 310 can be associated with an antenna, a port, a read or write circuit, a sector, a bus or a wire, a chip or a memory device, or a combination thereof.

As a more specific example, the computing system 100 can simultaneously access one or more instances of the individual data 304 within each instance of the access channels 310. The computing system 100 can simultaneously access instances of the individual data 304 from multiple instances of the access channels 310 in parallel.

The computing system 100 can process the data block 302 according to a first length 312, a second length 314, or a combination thereof. The first length 312 can represent a number or a quantity of the individual data 304 corresponding to each or single instance of the access channels 310. The second length 314 can represent a number of a quantity of the access channels 310.

For illustrative purposes, the data block 302 is shown in FIG. 3 with the first length 312 of 16 instances of the individual data 304 and the second length 314 also of 16 for 16 different instances of the access channels 310. However, it is understood that the data block 302 can be according to the first length 312 and the second length 314 of different sizes or dimensions greater than 1. The first length 312 and the second length 314 can also have the same or different size or dimension relative to each other. The data block 302 can further include the individual data 304 arranged or configured according to 3 or more directions or dimensions.

The individual data 304 can each be represented as 'S'. Each unique instance of the individual data 304 can be represented with a set of induces each corresponding to unique set of directions. For example, each unique instance of the individual data 304 can be represented as '$S_{a,b}$', with 'a' representing an index incrementing or changing along the first direction 306 and corresponding to the first length 312, and 'b' representing an index corresponding to and identifying each of the access channels 310.

As a more specific example, the first index 'a' can range from 0-15 along or within a corresponding channel as exemplified in FIG. 3. The second index 'b' can also range from 0-15 for representing 'channel 0'-'channel 15'.

The data block 302 can include one or more instances of the individual data 304 for providing protection. The data block 302 can include instances of the individual data 304 for performing error correction, error detection, or a combination thereof for other associated instances of the data block 302. For example, the data block 302 can include a first protection channel 316, a second protection channel 318, or a combination thereof.

The first protection channel 316 can be one instance of the access channels 310 dedicated to include or provide access to the individual data 304 including the protection information. The second protection channel 318 can be a separate or different instance of the access channels 310 dedicated to include or provide access to further instances of the individual data 304 including further protection information different from the first protection channel 316.

For illustrative purposes, the first protection channel 316 is shown in FIG. 3 as 'Channel 14' and the second protection channel 318 is shown as 'Channel 15'. However, it is understood that the first protection channel 316 and the second protection channel 318 can be arranged differently, such as at the opposite end, such as for 'Channel 0' or 'Channel 1', or between other instances of the access channels 310, or even mixing the protection individual data 304 separately in more than two channels with content data.

The protection information, such as parity protection, for the individual data 304 within the one or more protection channels can be generated or calculated using or according to a data protection mechanism. The data protection mechanism is a method, a circuitry, a process, or a combination thereof configured to generate or calculate the data protection mechanism for one or more units of data. The data protection mechanism can include a non-orthogonal mechanism 320 utilizing a non-orthogonal direction 322, a lengthwise mechanism 324 utilizing the first direction 306 or the second direction 308, or a combination thereof.

The non-orthogonal mechanism 320 is a method, a circuitry, a process, or a combination thereof configured to generate or calculate the individual data 304 according to or along the non-orthogonal direction 322 for one or more protection channels. The non-orthogonal mechanism 320 can be implemented using a processing circuit, such as the encoder module 204, the recovery module 202 of FIG. 2, the memory interface module 208, the host CPU 104, the host bus controller 108, the data management system 101, or a combination thereof.

The non-orthogonal mechanism 320 can calculate or generate a non-orthogonal protection data 326 corresponding to one or more instances of the individual data 304 along the non-orthogonal direction 322. The non-orthogonal mechanism 320 can further calculate or generate the non-orthogonal protection data 326 based on one or more instances of the individual data 304 along the non-orthogonal direction 322.

The non-orthogonal protection data 326 can include an instance of the individual data 304, such as including information or value, for correcting or detecting errors for the corresponding instances of the individual data 304. The non-orthogonal protection data 326 can be included or stored in the first protection channel 316 or the second protection channel 318.

The non-orthogonal direction 322 is a pattern, a track, or a combination thereof different from and not-parallel to any reference or boundary direction of the data block 302. For example, the non-orthogonal direction 322 can be different from and not-parallel to the first direction 306 and the second direction 308.

As a more specific example, the non-orthogonal direction 322 can intersect one of the reference directions at an angle less or greater than the other orthogonal reference direction. Also as a more specific example, the non-orthogonal direction 322 can be based on varying or incrementing the second index while incrementing the first index, based on varying or incrementing the first index while incrementing the second index, or a combination thereof.

For illustrative purposes, the non-orthogonal direction 322 is shown in FIG. 3 as incrementing vertically and horizontally, such as for 45 degree or a slope of 1 relative to the rectangular example of the data block 302. However, it is understood that the non-orthogonal direction 322 can be predetermined by the computing system 100 to be a direction corresponding to any direction other than the boundary or reference directions of the data block 302, such as for the first direction 306 and the second direction 308. It is also understood that the non-orthogonal direction 322 can include a zig-zag pattern or a change in the slope, a pattern following a polynomial of different degrees or exponentials, a logarithmic pattern, or a combination thereof.

The length-wise mechanism 324 is a method, a circuitry, a process, or a combination thereof configured to generate or calculate the individual data 304 according to or along a reference direction of the data block 302. The length-wise mechanism 324 can generate or calculate the individual data 304 according to or along the reference direction, such as the first direction 306 or the second direction 308.

As a more specific example, the length-wise mechanism 324 can generate or calculate a length-wise protection data 328 along the second direction 308 extending across multiple instances of the access channels 310. The length-wise mechanism 324 can calculate or generate the length-wise protection data 328 corresponding to one or more instances of the individual data 304 along the second direction 308. The length-wise mechanism 324 can further calculate or generate the length-wise protection data 328 based on one or more instances of the individual data 304 along the second direction 308.

The length-wise protection data 328 can include an instance of the individual data 304, such as including information or value, for correcting or detecting errors for the corresponding instances of the individual data 304. The length-wise protection data 328 can be similar in function as the non-orthogonal protection data 326 but corresponding to or based on the reference direction instead of the non-orthogonal direction 322. The length-wise protection data 328 can be included or stored in the second protection channel 318 or the first protection channel 316, different from the non-orthogonal protection data 326.

The length-wise protection data 328 can further correspond to, include, or be based on the non-orthogonal protection data 326. The non-orthogonal protection data 326 can further correspond to, include, or be based on the length-wise protection data 328.

As an illustrative example, the non-orthogonal mechanism 320 can calculate or generate non-orthogonal protection data 326 based on performing a logical or mathematical function, such as 'AND', 'OR', 'XOR', addition, subtraction, multiplications, shift, or a combination thereof. The computing system 100 can use the non-orthogonal mechanism 320 to calculate or generate the non-orthogonal protection data 326 based on performing the logical or mathematical functions using instances of the individual data 304 along the non-orthogonal direction 322.

As a more specific example, the computing system 100 can use the non-orthogonal mechanism 320 to store or include the non-orthogonal protection data 326 in the first protection channel 316, exemplified as 'Channel 14' in FIG. 3. The non-orthogonal mechanism 320 can be described as:

$$S_{i,14} = \Sigma_{k=0}^{13} S_{(i+k) \% 16, k}; \text{ for } 0 \leq i \leq 15. \qquad \text{Equation (1).}$$

The non-orthogonal protection data 326 stored or included in 'Channel 14' can be represented as '$S_{i,14}$' corresponding to position index 'i'. The remainder function based on the first length 312 or size of each channel, represented as '% 16', can be for wrapping around the edges or boundaries of the data block 302 while accessing the individual data 304 along the non-orthogonal direction 322.

Also as an illustrative example, the length-wise mechanism 324 can calculate or generate the length-wise protection data 328 based on performing a logical or mathematical function, such as 'AND', 'OR', 'XOR', addition, subtraction, multiplications, shift, or a combination thereof. The computing system 100 can use the length-wise mechanism 324 to calculate or generate the length-wise protection data 328 passed on performing the logical or mathematical functions using instances of the individual data 304 along the reference direction, such as the first direction 306 or the second direction.

As a more specific example, the computing system 100 can use the length-wise mechanism 324 to process along the second direction 308 across the channels, and to store or include the length-wise protection data 328 in the second protection channel 318, exemplified as 'Channel 15' in FIG. 3. The length-wise mechanism 324 can be described as:

$$S_{j,15} = \Sigma_{k=0}^{14} S_{j,k}; \text{ for } 0 \leq j \leq 15. \qquad \text{Equation (2).}$$

The length-wise protection data 328 stored or included in 'Channel 15' can be represented as '$S_{j,15}$' corresponding to position index 'j'.

As an illustrative example, the computing system 100 can use the non-orthogonal mechanism 320 to calculate or generate the non-orthogonal protection data 326. The non-orthogonal protection data 326 can be calculated or generated based on combining a target sector data 330 and one or more instances of non-orthogonal sector data 332 configured or arranged along the non-orthogonal direction 322 relative to the target sector data 330.

Continuing with the illustrative example, the non-orthogonal protection data 326 can be calculated or generated based on combining instances of the individual data 304 using logical or mathematical processes, such as according to equation (1). The non-orthogonal protection data 326 can be stored or included in the first protection channel 316 at a configuration or arrangement according to or relative to the target sector data 330, such as same position or sequence as the target sector data 330. The first protection channel 316 can correspond to 'Diagonal' RAID.

Also as an illustrative example, the computing system 100 can use the length-wise mechanism 324 to calculate or generate the length-wise protection data 328. The length-wise protection data 328 can be calculated or generated based on combining the target sector data 330 and one or more instances of reference-direction sector data 334 configured or arranged along a reference direction such as the second direction 308 across the access channels 310 relative to the target sector data 330.

Continuing with the illustrative example, the length-wise protection data 328 can be calculated or generated based on combining instances of the individual data 304 using logical or mathematical processes, such as according to equation (2). The length-wise protection data 328 can be stored or included in the second protection channel 318 at a configuration or arrangement according to or relative to the target sector data 330, such as same position or sequence as the target sector data 330. The second protection channel 318 can correspond to 'Dx' RAID or horizontal RAID.

The non-orthogonal protection data 326 can be utilized to provide soft information, hard information, or a combination thereof. The length-wise mechanism 324 can be utilized to also provide the soft information, the hard information, or a combination thereof.

The computing system 100 correct the individual data 304 based on the protection information, decoding function, or a combination thereof. For example, to correct the user sector or an instance of the individual data 304, the computing system 100 can decode a corrected result 336 representing a result of applying or combining the protection information to the individual data 304.

As a more specific example, to correct the target sector data 330 located at induces 'a' and 'b' represented as '$S_{a,b}$', the computing system 100 can decode a corrected result 336 represented as '$S'_{a,b}$'. The computing system 100 can calculate or generate the corrected result 336 based on combining or applying the non-orthogonal protection data 326, the length-wise protection data 328, or a combination thereof with or to the target sector data 330, as described by:

$$S'_{a,b} = S_{a,b} \oplus ((\Sigma_{k=0}^{13} s_{(a+k) \% 16, k} \oplus S_{b,14}) \& \Sigma_{j=0}^{15} S_{a,j}). \quad \text{Equation (3)}.$$

The computing system 100 can decode the corrected result 336 '$S'_{a,b}$' instead of the target sector data 330 '$S_{a,b}$'. The symbol '$\oplus$' can represent bitwise 'XOR' and '&' can represent bitwise 'AND'.

The memory interface module 208, the recovery module 202, the encoder module 204, the decoder module 212 of FIG. 2, or a combination thereof can be used to correct the user sector, calculate or generate the protective information, or a combination thereof. For example, the memory interface module 208 can calculate or generate the corrected result 336 represented as '$S'_{a,b}$' resulting from correcting the target sector data 330 represented as '$S_{a,b}$'.

Also for example, the memory interface module 208 can further calculate or generate the non-orthogonal protection data 326, the length-wise protection data 328, or a combination thereof. Also for example, the computing system 100 can utilize one or more components or circuits exemplified in FIG. 1 to process the corrected result 336, the non-orthogonal protection data 326, the length-wise protection data 328, or a combination thereof.

It has been discovered that the non-orthogonal protection data 326 and the length-wise protection data 328 calculated and generated according to the data protection mechanism provides increased accuracy in accessing and recovering information. The computing system 100 can further utilize the non-orthogonal protection data 326 and the length-wise protection data 328 processed across the access channels 310 using parallel channel reads. Each channel can read 2 sectors to process the protection information, which can further reduce processing burden while providing the increased accuracy with the additional protection.

Instead of reading 16 data units within a channel, the computing system 100 can operate based on reading 2 data units from each channel. This is a saving of 2/16 times of data transmission time, read access, or a combination thereof. The location of the data utilized for the decoding can be read in parallel or concurrently from different access channels 310. The access channels 310 can be separate devices or have the ability to be concurrently accessed at the same time. The concurrent access include provide data being read at the same or overlapping times. It has been discovered that reading data needed based on concurrent or parallel reading the channels improves the over system performance by eliminating system latency through reduced number of memory access required.

It has further been discovered that decoding the corrected result 336, resulting from recovery process of applying the non-orthogonal protection data 326 and the length-wise protection data 328 to the individual data 304, instead of the individual data 304 provides decrease in error or failure rate in processing the content data. The corrected result 336 can provide an error correction in addition to the decoding process, which can improve the recovery of the accessed, stored, or communicated information.

It has further been discovered that the increase in accuracy and reduction in failure rates is based on channel correlations for NAND channel models. The error correlation among the inner ECC codes within the overall frame and NAND characteristic, such as contributing to error correlation among underlying ECC sector, can be utilized to lower the error rates.

The error rates can be based on uncontrollable bit error rate (UBER), representing a ratio between a number of data errors and number of bits read in accessing the individual data 304 or the content therein. One data error can correspond to a sector containing corrupted data even if the sector is read multiple times each failing to return correct data. Similarly sector failure rate (SFR), frame error rate (FER), or bit error rate (BER) can further be utilized to characterize error rates for the computing system 100.

The locations of bit errors causing the error rates can be random without any correlation. However, correlations can be observed among pages, with some page indices having relatively smaller error rates while some have relatively higher error rates. If one 16 KB page is divided into 16 1 KB sectors, the error count per sector could also have some differences. The correlations among pages can be leveraged as discussed herein to provide the decrease in error rates.

Figure 4:
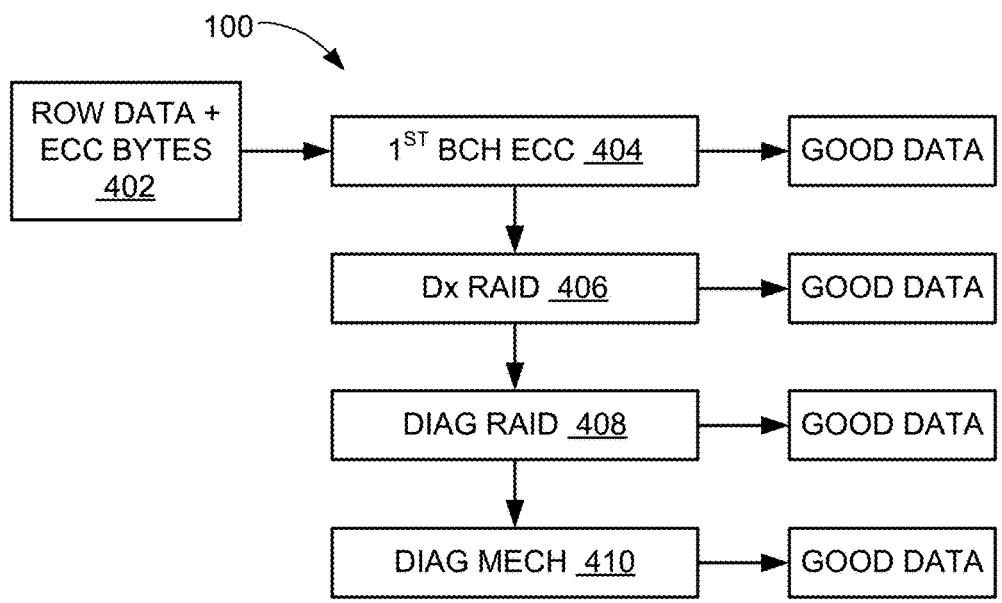
FIG. 4 is an example flow of the computing system.

Referring now to FIG. 4, therein is shown an example flow of the computing system 100. The flow exemplified in FIG. 4 can correspond to a multi-stage ECC and data recovery for a 'READ' operation, such as for accessing information from one or more of the memory devices 117 of FIG. 1 through the memory interface module 208 of FIG. 2.

The example flow can include an initial access of the information in a box 402, a sector recovery operation represented in a box 404, an initial directional recovery operation represented in a box 406, a further directional recovery operation represented in a box 408, and a combination recovery operation represented in a box 410. The computing system 100 can utilize the interface circuit as discussed above, the processing circuit as discussed above and further including the decoder module 212 of FIG. 2, or a combination thereof to implement the recovery operations.

Each of the operations can be implemented based on failure of the preceding operation or when the preceding operation fails to recover data meeting predetermined threshold or qualification. The flow can end without implementing any subsequent operations based on recovering and processing 'good data' meeting or satisfying the threshold or qualification.

The computing system 100 can access one or more of the individual data 304 of FIG. 3 for initially accessing the information as represented in the box 402. For example, the computing system 100 can access the code-word, such as for reading stored information or receiving transmitted information, from the individual data 304. The computing system 100 can use one or more of the memory devices 117 or other external devices, one or more interfaces corresponding thereto, including the memory interface module 208, or a combination thereof to access the content data, the ECC data, or a combination thereof corresponding to each of the individual data 304. The computing system 100 can further implement digital signal processing, such as for threshold tuning, 'read' retry, or a combination thereof.

The computing system 100 can implement the sector recovery operation as represented in the box 404 for the accessed information resulting from the box 402. The computing system 100 can utilize the data engine 115 of FIG. 1, the host CPU 104 of FIG. 1, the host bus controller 108 of FIG. 1, the decoder module 212, or a combination thereof to implement the sector recovery operation.

The computing system 100 can utilize the sector recovery operation to recover each of the code-word, such as recovering the content data of 512 B using the BCH ECC data. The computing system 100 can utilize the sector recovery to correct the Flash errors at each LBA/PPA data unit level. The computing system 100 can recover based on decoding, implementing error correction process, or a combination thereof. The computing system 100 can also utilize error detection process to recover the content data.

As discussed above, the individual data 304 can be further processed without any further recovery operations when the recovery operation represented in the box 404 is successful. The recovery process represented in the box 406 can be implemented when the recovery operation represented in the box 404 is not successful.

The computing system 100 can implement the initial directional recovery operation represented in the box 406 for the accessed information resulting from the box 402, a processing result of the operation represented in the box 404, or a combination thereof. The computing system 100 can utilize the data engine 115, the host CPU 104, the host bus controller 108, the recovery module 202 of FIG. 2, or a combination thereof to implement the initial directional recovery operation.

The computing system 100 can access the protection information corresponding to the reference direction for the initial direction recovery. For example, the computing system 100 can access and use information from the second protection channel 318 of FIG. 3 or the 'Dx' RAID. The computing system 100 can utilize the length-wise protection data 328 of FIG. 3, one or more of the individual data 304 corresponding thereto across the access channels 310 of FIG. 3, the length-wise mechanism 324 of FIG. 3, or a combination thereof.

The computing system 100 can recover using the decoding, correction, detection, or a combination of processes thereof as discussed above. The computing system 100 can further recover for the initial directional recovery using a predetermined method, process, circuit, mechanism, or a combination thereof. The computing system 100 can further process upon successful recovery or implement the subsequent recovery operation as discussed above.

The computing system 100 can implement the further directional recovery operation represented in the box 408 for the accessed information resulting from the box 402, a processing result of the operation represented in the box 404 or 406, or a combination thereof. The computing system 100 can utilize the data engine 115, the host CPU 104, the host bus controller 108, the recovery module 202, or a combination thereof to implement the further directional recovery operation.

For recovering based on the further direction, the computing system 100 can access the protection information corresponding to the non-orthogonal direction 322 of FIG. 3. For example, the computing system 100 can access and use information from the first protection channel 316 of FIG. 3 or the 'Diagonal' RAID. The computing system 100 can utilize the non-orthogonal protection data 326 of FIG. 3, one or more of the individual data 304 corresponding thereto, the non-orthogonal mechanism 320 of FIG. 3, or a combination thereof.

The computing system 100 can recover using the decoding, correction, detection, or a combination of processes thereof as discussed above. The computing system 100 can further recover for the further directional recovery using a predetermined method, process, circuit, mechanism, or a combination thereof. The computing system 100 can further process upon successful recovery or implement the subsequent recovery operation as discussed above.

The computing system 100 can implement the combination recovery operation represented in the box 410 for the accessed information resulting from the box 402, a processing result of the operation represented in one or more of the boxes 404-408, or a combination thereof. The computing system 100 can utilize the data engine 115, the host CPU 104, the host bus controller 108, the recovery module 202, or a combination thereof to implement the combination recovery operation.

The computing system 100 can access the protection information corresponding to both the reference direction and the non-orthogonal direction 322. For example, the computing system 100 can access and use information from the first protection channel 316 and the second protection channel 318. The computing system 100 can utilize the non-orthogonal protection data 326 and the length-wise protection data 328, one or more of the individual data 304 corresponding thereto, the non-orthogonal mechanism 320 and the length-wise mechanism 324, or a combination thereof.

The computing system 100 can recover using the decoding, correction, detection, or a combination of processes thereof as discussed above. The computing system 100 can further recover for the further directional recovery using a predetermined method, process, circuit, mechanism, or a combination thereof, such as described in Equation (3). The computing system 100 can further process upon successful recovery or otherwise return a failure status.

For illustrative purposes, the flow chart is shown as a linear process, although it is understood that the flow chart can operate differently. As an example, iterations between the different recovery operations are possible. It has been discovered that the multi-stage ECC recovery discussed above reduces outstanding errors with minimal amount of required resources, such as for 'read' and 'write'.

The modules described in this application can be hardware implementation or hardware accelerators, including passive circuitry, active circuitry, or both as exemplified in FIG. 1. The navigation system 100 has been described with module functions or order as an example. The navigation system 100 can partition the modules differently or order the modules differently.

The various modules, corresponding methods or operation discussed above, or a combination thereof can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The various storage devices or memory circuits discussed in FIG. 1 can represent the non-transitory computer readable medium. The various storage devices or memory circuits can be removable from a larger scale device or system. Examples of the non-transitory computer readable medium can be a non-volatile memory card or stick, an external hard disk drive, a tape cassette, or an optical disk.

The physical transformation of the intended content data, such as based on ECC data and the non-orthogonal sector data 332 of FIG. 3 results in the movement in the physical world, such as physical change based on recovery and implementation of the content data such as processing of location information or display representations of real-world objects. Movement or changes of the content data into encoded information, the non-orthogonal protection data 326, the corrected result 336 of FIG. 3, decoded result, or a combination thereof in the physical world results in updates to the content data for improved recovery rate.

Figure 5:
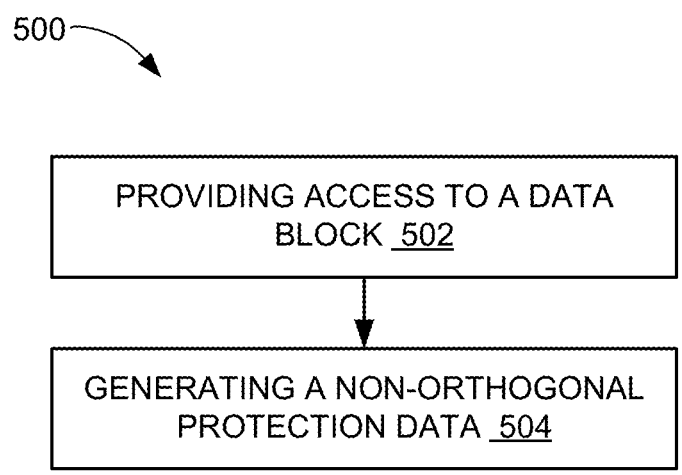
FIG. 5 is an example of a flow chart of a method of operation of a computing system in an embodiment of the present invention.

Referring now to FIG. 5, therein is shown a flow chart of a method 500 of operation of a computing system in an embodiment of the present invention. The method 500 includes: providing access to a data block including an arrangement of multiple individual data in a block 502; and generating with a processing circuit a non-orthogonal protection data corresponding to instances of the individual data along a non-orthogonal direction within the data block for correcting the one or more of the corresponding instances of the individual data in a block 504.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an interface circuit configured to provide access to a data block including an arrangement of multiple individual data along a second direction across access channels and a first direction along each of the access channels and orthogonal to the second direction; and
   a processing circuit, coupled to the interface circuit, configured to:
      generate a non-orthogonal protection data corresponding to instances of the individual data along a non-orthogonal direction within the data block for correcting the one or more of the corresponding instances of the individual data, and
      generate the non-orthogonal protection data based on combining a target sector data and a non-orthogonal sector data both representing instances of the individual data,
   wherein:
      the non-orthogonal sector data is arranged along the non-orthogonal direction relative to the target sector data, and
      the non-orthogonal direction not parallel and not orthogonal to both the first direction and the second direction.

2. The system as claimed in claim 1 wherein the processing circuit is configured to decode the one or more of the corresponding instances of the individual data based on the non-orthogonal protection data.

3. The system as claimed in claim 1 wherein the interface circuit is configured to provide access to the data block including the overall grouping of the individual data arranged according to access channels corresponding to the processing circuit.

4. The system as claimed in claim 1 wherein the processing circuit is configured to generate the non-orthogonal protection data based on combining the instances of the individual data along the non-orthogonal direction.

5. The system as claimed in claim 1 wherein the processing circuit is configured to generate a length-wise protection data corresponding to further instances of the individual data along a reference direction of the data block, the length-wise protection data for correcting the one or more of the corresponding instances of the individual data along with the non-orthogonal protection data.

6. The system as claimed in claim 1 wherein:
   the interface circuit is configured to provide access to the data block including the overall grouping of the individual data arranged along the second direction across the access channels corresponding to the processing circuit and the first direction along each of the access channels and orthogonal to the second direction;
   the processing circuit is configured to:
      generate a length-wise protection data based on combining the target sector data and a reference-direction sector data, wherein the length-wise protection data is arranged along the second direction relative to the target sector data.

7. The system as claimed in claim 6 wherein the processing circuit is configured to:
   generate a corrected result based on applying the non-orthogonal protection data and the length-wise protection data to the target sector data; and
   decode the corrected result instead of the target sector data.

8. The system as claimed in claim 6 wherein the interface circuit is configured to provide parallel access to one or more of the target sector data, the non-orthogonal sector data, or the adjacent sector data.

9. The system as claimed in claim 6 wherein the interface circuit is configured to provide access to the data block including a first protection channel and a second protection channel, wherein the first protection channel is dedicated to one or more instances of the non-orthogonal protection data and the second protection channel is dedicated to one or more instances of the length-wise protection data.

10. The system as claimed in claim 6 wherein the interface circuit is configured to provide access to the data block including the access channels corresponding to NAND channel model.

11. A method of operation of a computing system comprising:
providing access to a data block including an arrangement of multiple individual data along a second direction across access channels and a first direction along each of the access channels and orthogonal to the second direction; and generating with a processing circuit a non-orthogonal protection data corresponding to instances of the individual data along a non-orthogonal direction within the data block for correcting the one or more of the corresponding instances of the individual data
generating the non-orthogonal protection data based on combining a target sector data and a non-orthogonal sector data both representing instances of the individual data, wherein:
the non-orthogonal sector data is arranged along the non-orthogonal direction relative to the target sector data, and
the non-orthogonal direction not parallel and not orthogonal to both the first direction and the second direction.

12. The method as claimed in claim 11 further comprising decoding the one or more of the corresponding instances of the individual data based on the non-orthogonal protection data.

13. The method as claimed in claim 11 wherein providing access to the data block includes providing access to the data block including the overall grouping of the individual data arranged according to access channels.

14. The method as claimed in claim 11 wherein generating the non-orthogonal protection data includes generating the non-orthogonal protection data based on combining the instances of the individual data along the non-orthogonal direction.

15. The method as claimed in claim 11 further comprising generating a length-wise protection data corresponding to further instances of the individual data along a reference direction of the data block, the length-wise protection data for correcting the one or more of the corresponding instances of the individual data along with the non-orthogonal protection data.

16. A non-transitory computer readable medium including instructions for execution on a computing system, the instructions comprising:
providing access to a data block including an arrangement of multiple individual data along a second direction across access channels and a first direction along each of the access channels and orthogonal to the second direction;
generating a non-orthogonal protection data corresponding to instances of the individual data along a non-orthogonal direction within the data block for correcting the one or more of the corresponding instances of the individual data; and
generating the non-orthogonal protection data based on combining a target sector data and a non-orthogonal sector data both representing instances of the individual data, wherein:
the non-orthogonal sector data is arranged along the non-orthogonal direction relative to the target sector data, and
the non-orthogonal direction not parallel and not orthogonal to both the first direction and the second direction.

17. The non-transitory computer readable medium as claimed in claim 16 including the instructions further comprising decoding the one or more of the corresponding instances of the individual data based on the non-orthogonal protection data.

18. The non-transitory computer readable medium as claimed in claim 16 wherein providing access to the data block includes providing access to the data block including the overall grouping of the individual data arranged according to access channels.

19. The non-transitory computer readable medium as claimed in claim 16 wherein generating the non-orthogonal protection data includes generating the non-orthogonal protection data based on combining the instances of the individual data along the non-orthogonal direction.

20. The non-transitory computer readable medium as claimed in claim 16 including the instructions further comprising generating a length-wise protection data corresponding to further instances of the individual data along a reference direction of the data block, the length-wise protection data for correcting the one or more of the corresponding instances of the individual data along with the non-orthogonal protection data.

* * * * *